July 5, 1960  A. D. ISBELL  2,943,811
FISHING REEL
Filed March 24, 1958
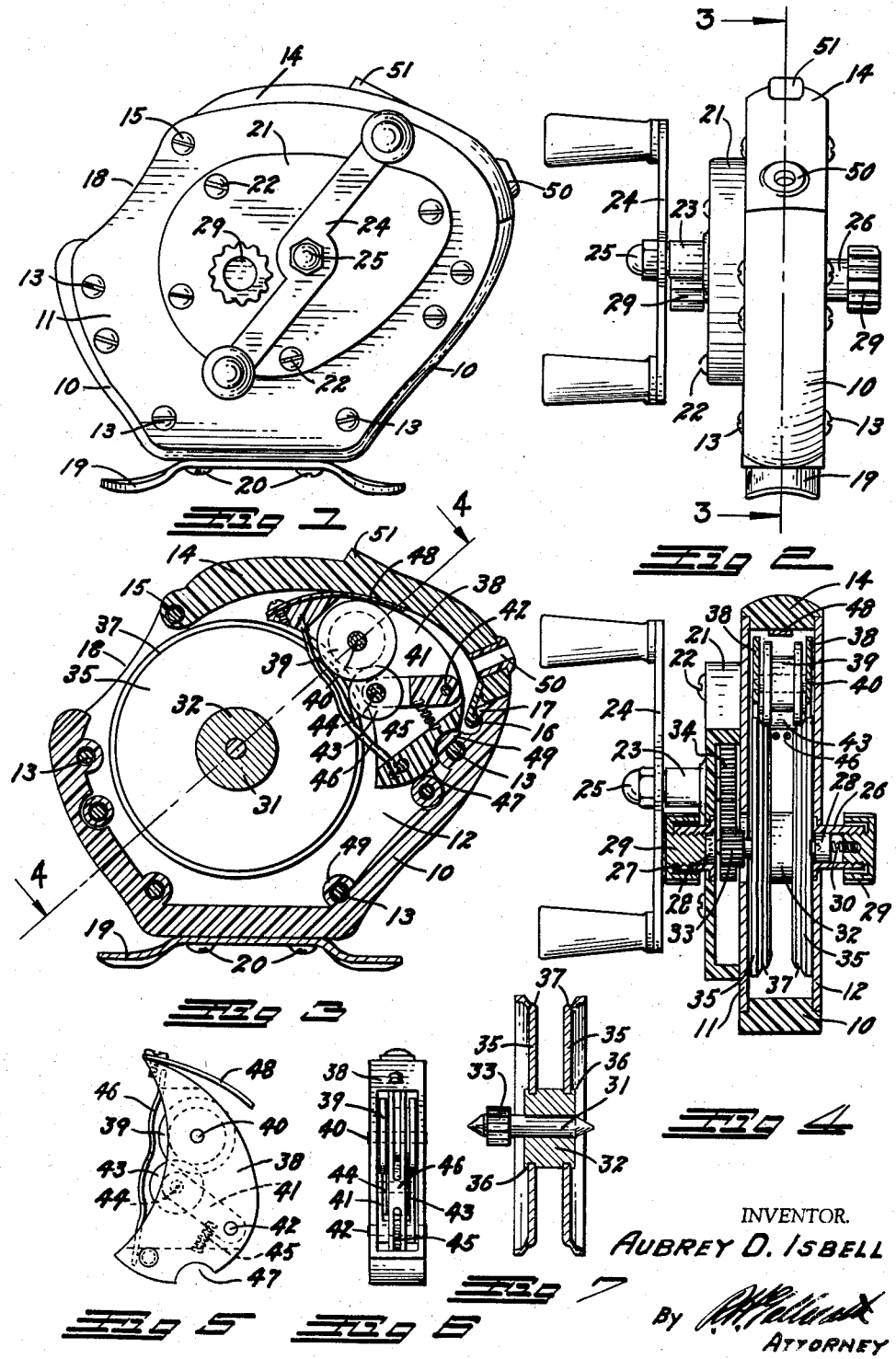
INVENTOR.
AUBREY D. ISBELL
BY
ATTORNEY United States Patent Office 2,943,811
Patented July 5, 1960

2,943,811

FISHING REEL

Aubrey D. Isbell, 1005 Garfield St., Loveland, Colo.

Filed Mar. 24, 1958, Ser. No. 723,402

4 Claims. (Cl. 242—84.1)

This invention relates to a fishing reel and has for its principal object the provision of a simple and highly efficient line controlling mechanism which will draw the line from the spool of the reel and positively force the line from the reel to prevent looseness and entanglement of the line within the reel and which acts to maintain a controlled tension in the line as it reels on and off the spool so as to insure a perfectly uniform line coil at all times.

Another object of the invention is to incorporate the line controlling mechanism in a complete unit which may be quickly and easily inserted in or removed from the reel to facilitate line and spool replacement.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved reel with the line control unit in place therein;

Fig. 2 is a rear view thereof;

Fig. 3 is a vertical longitudinal section, taken on the line 3—3, Fig. 2,

Fig. 4 is a diagonal cross-section taken on the line 4—4, Fig. 3;

Fig. 5 is a side view of the line control unit removed from the reel;

Fig. 6 is a rear view of the line control unit of Fig. 5; and

Fig. 7 is a detail cross-section through a line spool employed in the improved reel.

The improved reel comprises a reel housing 10 preferably, but not necessarily, formed from molded plastic. The side faces of the reel housing are peripherally indented to receive a left face plate 11 and a right face plate 12 which are attached to the opposite faces of the housing by means of suitable screws 13. The inner surface of the housing is formed with cylindrical bosses 49 for the reception of the screws 13.

The housing is formed with a top opening and the opening is partially closed by means of a lid flap 14 which is hinged at its rear extremity upon a suitable hinge pin 15 and which is detachably latched at its forward extremity to the housing 10 between the face plates 11 and 12. As illustrated, the latching of the flap is accomplished by means of a resilient latch tongue 16 on the lid flap which engages a latching protuberance 17 on the interior of the housing. The lid flap 14 is provided with a line grommet 50 and with a suitable finger knob 51. The rear extremity of the lid flap 14 is spaced from the housing to form a thumb opening 18. The housing is provided with the usual rod foot 19 secured thereto by means of suitable attachment screws 20.

A gear case 21 is secured to the outer face of the front face plate 11 by means of suitable screws 22. The gear case is provided with a winding shaft bearing 23 in which a conventional spool winding shaft is rotatably mounted. The external extremity of the winding shaft is provided with a double-ended reel crank 24 of one of the usual fishing reel types which is secured therein by means of a retaining nut 25.

An internally-threaded pivot sleeve 26 is mounted in the right face plate 12 and a second similar internally-threaded pivot sleeve 27 is mounted in the gear case 21 in axial alignment with the first sleeve. Each pivot sleeve is provided with a bearing element 28. The bearing elements are urged toward each other by means of terminal caps 29, there being one terminal cap threaded into each sleeve. A compression spring 30 is interposed between the terminal cap 29 and the bearing element 28 in the right sleeve 26.

The bearing elements 28 serve as pivot bearings for pointed pivot extremities formed on a spool shaft 31. A line spool 32 is fixedly mounted upon the spool shaft between the face plates 11 and 12 and a toothed pinion 33 is fixedly mounted on the spool shaft 31 within the gear case 21. The pinion 33 is in constant mesh with a relatively large drive gear 34 fixedly mounted on the crank shaft within the gear case 21. Thus, it can be seen that rotation of the winding crank 24 will impart rotation at multiplied speed to the spool 32.

The spool 32 is provided with two circular, dished, spool side plates 35 secured thereto in any desired manner such as by means of a rolled flange 36. The side plates are dished to guide the line onto the spool 32 and each is provided with a circular land or track 37 for driving the mechanism of the improved line control unit.

The line control unit, shown in detail in Figs. 5 and 6 comprises a somewhat crescent-shaped, hollow, plastic block 38 in which a grooved traction roller 39 is journalled upon a pivot pin 40. A swingable pressure roller yoke 41 is pivoted within the block 38 upon a pivoted pin 42. A pressure roller 43 is mounted in a bifurcation in the extremity of the yoke 41 upon a suitable bearing pin 44. The pressure roller 43 is relatively narrower than the traction roller 39 and rides in the peripheral groove in the latter and is constantly urged into contact with the bottom of the groove by means of a compression spring 45 acting against the bottom of the yoke 41. A slotted vertically-positioned line guide 46 is medially positioned forwardly of the rollers 39 and 43. The block 38 is provided with a locating notch 47 in its bottom and with a resilient leaf-type pressure spring 48 at its top.

The line control device of Fig. 5 is inserted in the reel of Fig. 1 by opening the lid flap 14 and dropping the block 38 between the side plates 11 and 12 forwardly of the spool 32 so that the locating notch 47 will fit over one of the cylindrical screw bosses 49. The lid flap 14 is then snapped to the latched position against the spring 48 so as to resiliently flex the latter to cause it to resiliently urge the peripheries of the two sides of the traction roller 39 against the lands or tracks 37 on the side plates 35 of the spool so that the rollers 39 and 43 will be driven by frictional contact with the spool side plates. The rollers 39 and 43 are preferably formed from nylon so that highly efficient non-corrosive contact surfaces are provided.

If the line is wound upon the line spool 32 in the customary manner, the extremity of the line is then passed through the slotted line guide 46 and thence between the traction roller 39 and the pressure roller 43. For convenience, the block 38 can be removed from the reel to facilitate passing the line through the line guide and between the rollers and can then be dropped back in place in the reel. The line is then extended through the line grommet 50 and is strung through the line guides on the rod for fishing purposes.

The diameter of the coil of line on the spool will always be less than the diameter of the driving tracks 37 on the spool side plates. Therefore, the contacting surfaces of the rollers 39 and 43 will always travel at a higher lineal speed than the circumference of the line coil. Therefore, when the spool is manually rotated to unreel the line, the rollers frictionally pull the line from the spool and project it through the grommet 50 so as to always maintain a tension on the coiled line to prevent bunching, looping or tangling within the reel. This tension is flexible since the line can always slip between the rollers and the rollers can slip on the rim tracks 37.

The rollers 39 and 43 also serve other useful functions, for instance, they serve as a brake to prevent the spool from spinning at the termination of a "play"; they act as wipers or wringers for removing water from the line; and they assist in "retrieving" the line by their moving friction therewith.

The withdrawal or "play" of the line is controlled by the fisherman's thumb which can be pressed against the two spool side plates 35 of the spool through the thumb opening 18 to provide any desired resistance or braking action to the outgoing line.

While a specific form of the improvement has been described and illustrated herein, it is to be understood that the same may be varied within the scope of the appended claims, without departing from the spirit of the invention.

Having thus described the invention, what is claimed and desired secured by Letters Patent is:

1. A reel for a fishing line comprising: a housing; a spool rotatably mounted in said housing and adapted to reel a fishing line; means for manually rotating said spool; a roller block pivotally mounted at its one extremity in said housing in the plane of and adjacent said spool; a traction roller rotatably mounted in and adjacent the other extremity of said block and axially parallel to said spool; a pressure roller rotatably mounted in said block; resilient means urging said pressure roller toward said traction roller to engage the fishing line as it passes from said spool between said rollers and thence from said housing; a spring urging said block to rotate about its pivot to bring said traction roller into contact with the spool so that rotation of the spool will impart rotation to both rollers; an opening in said housing over said roller block; a hinged lid flap pivotally mounted at its rearward extremity axially parallel to said spool and closing said opening, said spring being mounted on said block in a position to be contacted by said lid flap as the latter is closed so as to resiliently maintain said block in said housing; and latch means for latching said lid flap closed.

2. A reel for a fishing line as described in claim 1 having a spool side plate on each side of said spool and a circular track on each spool side plate with which said traction roller makes rolling contact.

3. A reel for a fishing line as described in claim 2 having a line guide member mounted in said block rearwardly of said rollers to guide said line between said rollers.

4. A reel for a fishing line as described in claim 3 having interlocking means coacting between said block and said reel for locating and maintaining said block in a predetermined position in said reel.

References Cited in the file of this patent

UNITED STATES PATENTS

| | | |
|---|---|---|
| 1,960,491 | Johnson | May 29, 1934 |
| 2,051,259 | James | Aug. 18, 1936 |
| 2,675,187 | Childress | Apr. 13, 1954 |
| 2,776,096 | Isbell | Jan. 1, 1957 |